US010725798B2

(12) United States Patent
Kurien et al.

(10) Patent No.: US 10,725,798 B2
(45) Date of Patent: Jul. 28, 2020

(54) METHOD, SYSTEM, AND COMPUTER PROGRAM PRODUCT FOR DYNAMIC DEVELOPMENT OF AN APPLICATION PROGRAMMING INTERFACE

(71) Applicant: Visa International Service Association, San Francisco, CA (US)

(72) Inventors: Libby Annie Kurien, Santa Clara, CA (US); Maria Julieta Licup-Fajarda, Newark, CA (US)

(73) Assignee: Visa International Service Association, San Francisco, CA (US)

( * ) Notice: Subject to any disclaimer, the term of this patent is extended or adjusted under 35 U.S.C. 154(b) by 48 days.

(21) Appl. No.: 16/210,294

(22) Filed: Dec. 5, 2018

(65) Prior Publication Data

US 2020/0183711 A1    Jun. 11, 2020

(51) Int. Cl.
*G06F 3/048* (2013.01)
*G06F 9/451* (2018.01)
*G06Q 30/04* (2012.01)
*G06F 9/54* (2006.01)

(52) U.S. Cl.
CPC .............. *G06F 9/451* (2018.02); *G06F 9/543* (2013.01); *G06Q 30/04* (2013.01)

(58) Field of Classification Search
CPC .......... G06F 3/01; G06F 3/048; G06F 3/0481; G06F 3/0484; G06F 3/14; G06F 3/1415; G06F 17/27; G03B 21/14; H04N 9/31; H04N 9/3147; H04N 9/3185; H04N 9/3188; H04N 9/3194; G06K 9/00; G06K 9/00335; G06T 3/00; G06T 3/0093; G10L 15/22

See application file for complete search history.

(56) References Cited

U.S. PATENT DOCUMENTS 7,222,147 B1 * 5/2007 Black ................... H04L 41/0803
                                                709/200
7,272,615 B2    9/2007 Li et al.
8,095,565 B2    1/2012 Dengler et al.
(Continued)

OTHER PUBLICATIONS

"Fully Metadata-Driven Apps", https://help.sap.com/doc/d9c75eebcfa840c8a4aa4b0e6a8136de/3.0.14/en-US/7c05cc4f700610148815d7ef5cb94d2c.html, 33 pages.
(Continued)

*Primary Examiner* — Xiomara L Bautista
(74) *Attorney, Agent, or Firm* — The Webb Law Firm

(57) ABSTRACT

A method for dynamic development of an application programming interface (API) including: receiving a first data file; generating an API configured to receive client data associated with a transaction message, where the generating the API includes: providing a data agnostic template; for each specific data parameter of the plurality of specific data parameters, assigning each template field with a corresponding specific data entry associated with the specific data parameter; and configuring a second user interface associated with the API by associating at least one display parameter with each specific data parameter of the plurality of specific data parameters; and displaying the second user interface such that a field displayed by the second user interface is configured to receive the data associated with each specific data parameter of the plurality of specific data parameters.

20 Claims, 12 Drawing Sheets

(56) References Cited

U.S. PATENT DOCUMENTS

| | | | |
|---|---|---|---|
| 8,381,113 B2 | 2/2013 | Kamdar et al. | |
| 10,108,399 B1* | 10/2018 | Perry | G06Q 20/08 |
| 10,489,754 B2* | 11/2019 | Fineman | G06Q 30/0207 |
| 2004/0024610 A1* | 2/2004 | Fradkov | G06Q 20/04 |
| | | | 719/328 |
| 2004/0139016 A1* | 7/2004 | Forzley | G06Q 20/00 |
| | | | 705/40 |
| 2006/0149671 A1* | 7/2006 | Nix | G06Q 20/04 |
| | | | 705/40 |
| 2012/0179558 A1* | 7/2012 | Fischer | G06Q 20/20 |
| | | | 705/16 |
| 2013/0346302 A1* | 12/2013 | Purves | G06Q 20/102 |
| | | | 705/40 |
| 2014/0019352 A1* | 1/2014 | Shrivastava | G06Q 20/3674 |
| | | | 705/41 |
| 2015/0178708 A1* | 6/2015 | Reutov | G06Q 20/405 |
| | | | 705/44 |
| 2018/0349984 A1* | 12/2018 | Kao | G06Q 40/02 |

OTHER PUBLICATIONS

Kendall, "Meta-Driven Design: Designing a Flexible Engine for API Data Retrieval", InfoQ, Apr. 13, 2015, 12 pages.

\* cited by examiner

122

1st File — 130

| Merchant ID | Acquirer BIN | Acquirer Country code | Acquirer Business ID | Merchant Name | ... |
|---|---|---|---|---|---|
| 0001 | 113 | 001 | 852 | Acme, Inc. | |
| 0002 | 113 | 001 | 852 | Company 1, LLC | |
| ⋮ | ⋮ | ⋮ | ⋮ | ⋮ | ⋮ |
| 0724 | 113 | 001 | 852 | Incorporated.com | |

2nd File

| Client ID | Acquirer BIN | Acquirer Country Code | Acquirer Business ID | ... |
|---|---|---|---|---|
| 123 | 113 | 001 | 852 | |
| 124 | 113 | 001 | 852 | |
| ⋮ | ⋮ | ⋮ | ⋮ | ⋮ |
| 141 | 113 | 001 | 852 | |

FIG. 3B

A – API Field Metadata Definition

1. Field Name
2. Field Label
3. Field Type
4. Max Field Length
5. Strict Length Value
6. Decimal Places (if numeric)
7. Field Width in Pixels
8. Combo Name
9. Extract Only (Y/N)
10. Extract Field Name
11. Edit Table Name
12. Edit Column Name
13. Help Text

FIG. 4A

A - API Field Metadata Definition ⌐40

| # | Field | Value |
|---|---|---|
| 1. | Field Name | Acquirer BIN |
| 2. | Field Label | Enter Acquirer BIN |
| 3. | Field Type | Num |
| 4. | Max Field Length | 3 |
| 5. | Strict Length Value | 0 |
| 6. | Decimal Places (if numeric) | 0 |
| 7. | Field Width in Pixels | |
| 8. | Combo Name | |
| 9. | Extract Only (Y/N) | No |
| 10. | Extract Field Name | Acquirer BIN |
| 11. | Edit Table Name | |
| 12. | Edit Column Name | |
| 13. | Help Text | |

FIG. 4B

Enter the fields that are associated with the API, as well as the screen field sequence and extract field sequence

| Field Name | Required | Warn ifBlank | Updatable | Screen Field Seq | Extract Field Seq |
|---|---|---|---|---|---|
| Client ID | Yes | No | No | 000 | 001 |
| Acquirer BIN | Yes | No | No | 001 | 002 |
| Acquirer Country Code | Yes | No | Yes | 002 | 003 |
| Acquirer Business ID | Yes | No | Yes | 003 | 004 |

FIG. 5

1st File

| Consumer ID | First Name | Last Name | M.I. | PAN | ... |
|---|---|---|---|---|---|
| 0001 | John | Aaron | A | 1234567891011106 | |
| 0002 | Sally | Abbott | B | 1234567891011852 | |
| ⋮ | ⋮ | ⋮ | ⋮ | ⋮ | ⋮ |
| 5841 | Thomas | Zyan | C | 1234567891011412 | |

2nd File

| Client ID | Client's Consumer ID | ISO 8583 Data Field 2 | ISO 8583 Data Field 61 | . . . |
|---|---|---|---|---|
| 624 | 0001 | 12345678910111106 | 124 | |
| 624 | 0002 | 12345678910111852 | 345 | |
| ⋮ | ⋮ | ⋮ | ⋮ | ⋮ |
| 624 | 5841 | 12345678910111412 | 782 | |

METHOD, SYSTEM, AND COMPUTER PROGRAM PRODUCT FOR DYNAMIC DEVELOPMENT OF AN APPLICATION PROGRAMMING INTERFACE

BACKGROUND

1. Field

The disclosure relates to development of an application programming interface (API) and, in one non-limiting embodiment or aspect, to a method, system, and computer program product for dynamic development of an API, such as an API configured for onboarding a client by converting a first data file of a client having a first format to a second data file having a second format, which may be used to generate the API.

2. Technical Considerations

An application programming interface (API) may include a set of subroutine definitions, communication protocols, and/or tools for building software. For example, an API may be a set of clearly defined methods of communication between various components of a computer, a computer system, a network of computers, and/or the like. In some instances, an API may be used for a web-based computer system, a computer operating system, database system, computer hardware, and/or a software library. An API may include an API specification that may include specifications for routines, data structures, object classes, variables, and/or remote calls to be made by a computer.

In an electronic payment processing network, an acquirer system of an acquirer bank wishing to process transactions using a transaction processing system of a transaction service provider may undergo an onboarding process. The onboarding process may allow the acquirer system to process transactions as a part of the electronic payment processing network facilitated by the transaction service provider. Processing of the transaction may require the acquirer system to communicate static data that does not change for the acquirer system from transaction to transaction.

The above-described onboarding example may include a situation where an acquirer system is onboarded by reconfiguring stored data from a first format to a second format, and, for each example, the reconfiguring may vary based on the client's initial data format (e.g., the first format).

Existing systems performing this onboarding process may include static screens (e.g., user interfaces). Reconfiguring the static screens to conform to the data received may require significant development efforts, which impacts the ultimate time required to complete onboarding. These existing systems may undergo a cumbersome development cycle in which, based on the first format of the data received from the client, a suitable API must be developed.

SUMMARY

Accordingly, and generally, provided is an improved method, system, and computer program product for dynamic development of an application programming interface (API).

According to a non-limiting embodiment or aspect, a method for dynamic development of an API includes: receiving, with at least one processor, a first data file including a plurality of data entries, each data entry including a plurality of values of a plurality of specific data parameters; generating, with at least one processor, an API configured to receive client data associated with a transaction message, where the generating the API includes: providing a data agnostic template including a first graphical user interface, the data agnostic template including a plurality of data agnostic parameters, each data agnostic parameter including a template field, each template field configured to receive a specific data entry associated with a specific data parameter of the plurality of specific data parameters; for each specific data parameter of the plurality of specific data parameters, assigning each template field with a corresponding specific data entry associated with the specific data parameter; and configuring a second user interface associated with the API by associating at least one display parameter with each specific data parameter of the plurality of specific data parameters; and displaying, with at least one processor, the second user interface, such that a field displayed by the second user interface is configured to receive the data associated with each specific data parameter of the plurality of specific data parameters.

In one non-limiting embodiment or aspect, a specific data parameter of the plurality of specific data parameters may include a specific label associated with the specific data parameter. The plurality of specific data parameters may include at least one data element associated with data elements defined by ISO 8583. The plurality of specific data parameters may include at least one data element associated with a client identifier. The first data file may be associated with an a first acquirer system, and the method may further include: receiving, with at least one processor, the data associated with each specific data parameter of the plurality of specific data parameters; based on the received data, generating, with at least one processor, a second data file; generating, with at least one processor and based on the second data file, an API associated with the first acquirer system; receiving, with at least one processor, an abbreviated transaction message from the first acquirer system, the abbreviated transaction message associated with a payment transaction; and augmenting, with at least one processor and based on the API, the abbreviated transaction message with at least a portion of the data from the second data file. The method may further include: receiving, with at least one processor, another data file including a plurality of data entries, each data entry including a plurality of second specific data parameters, the second specific data parameters different from the specific data parameters associated with the first data file; and using the data agnostic template to display a user interface configured to receive client data associated with each second specific data parameter of the plurality of second specific data parameters. The first data file may be received by a transaction processing system of a transaction service provider from an issuer system of an issuer bank or an acquirer system of an acquirer.

According to a non-limiting embodiment or aspect, a system for dynamic development of an API includes at least one processor programmed or configured to: receive a first data file including a plurality of data entries, each data entry including a plurality of values of a plurality of specific data parameters; generate an API configured to receive client data associated with a transaction message by: providing a data agnostic template including a first graphical user interface, the data agnostic template including a plurality of data agnostic parameters, each data agnostic parameter including a template field, each template field configured to receive a specific data entry associated with a specific data parameter of the plurality of specific data parameters; for each specific data parameter of the plurality of specific data parameters, assigning each template field with a corresponding specific data entry associated with the specific data parameter; and configuring a second user interface associated with the API by associating at least one display parameter with each specific data parameter of the plurality of specific data parameters; and display the second user interface, such that a field displayed by the second user interface is configured to receive the data associated with each specific data parameter of the plurality of specific data parameters.

In one non-limiting embodiment or aspect, a specific data parameter of the plurality of specific data parameters may include a specific label associated with the specific data parameter. The plurality of specific data parameters may include at least one data element associated with data elements defined by ISO 8583. The plurality of specific data parameters may include at least one data element associated with a client identifier. The first data file may be associated with an a first acquirer system, and the at least one processor may be programmed or configured to: receive the data associated with each specific data parameter of the plurality of specific data parameters; based on the received data, generate a second data file; generate, based on the second data file, an API associated with the first acquirer system; receive an abbreviated transaction message from the first acquirer system, the abbreviated transaction message associated with a payment transaction; and augment, based on the API, the abbreviated transaction message with at least a portion of the data from the second data file. The first data file may be associated with a first acquirer system, and the one or more instructions may cause the at least one processor to: receive the data associated with each specific data parameter of the plurality of specific data parameters; based on the received data, generate a second data file; generate, based on the second data file, an API associated with the first acquirer system; receive an abbreviated transaction message from the first acquirer system, the abbreviated transaction message associated with a payment transaction; and augment, based on the API, the abbreviated transaction message with at least a portion of the data from the second data file. The at least one processor may be programmed or configured to: receive another data file including a plurality of data entries, each data entry including a plurality of second specific data parameters, the second specific data parameters different from the specific data parameters associated with the first data file; and use the data agnostic template to display a user interface configured to receive data associated with each second specific data parameter of the plurality of second specific data parameters. The first data file may be received by a transaction processing system of a transaction service provider from an issuer system of an issuer bank or an acquirer system of an acquirer.

According to a non-limiting embodiment or aspect, a computer program product for dynamic development of an application programming interface (API), the computer program product including at least one non-transitory computer-readable medium including one or more instructions that, when executed by at least one processor, cause the at least one processor to: receive a first data file including a plurality of data entries, each data entry including a plurality of values of a plurality of specific data parameters; generate an API configured to receive client data associated with a transaction message by: providing a data agnostic template including a first graphical user interface, the data agnostic template including a plurality of data agnostic parameters, each data agnostic parameter including a template field, each template field configured to receive a specific data entry associated with a specific data parameter of the plurality of specific data parameters; for each specific data parameter of the plurality of specific data parameters, assigning each template field with a corresponding specific data entry associated with the specific data parameter; and configuring a second user interface associated with the API by associating at least one display parameter with each specific data parameter of the plurality of specific data parameters; and display the second user interface, such that a field displayed by the second user interface is configured to receive the data associated with each specific data parameter of the plurality of specific data parameters.

In one non-limiting embodiment or aspect, a specific data parameter of the plurality of specific data parameters may include a specific label associated with the specific data parameter. The plurality of specific data parameters may include at least one data element associated with data elements defined by ISO 8583. The plurality of specific data parameters may include at least one data element associated with a client identifier. The one or more instructions may cause the at least one processor to: in response to displaying the second user interface, convert, using the generated API, the first data file into a converted data file having a predetermined second format. The one or more instructions may cause the at least one processor to: receive another data file including a plurality of data entries, each data entry including a plurality of second specific data parameters, the second specific data parameters different from the specific data parameters associated with the first data file; and use the data agnostic template to display a user interface configured to receive client data associated with each second specific data parameter of the plurality of second specific data parameters. The first data file may be received by a transaction processing system of a transaction service provider from an issuer system of an issuer bank or an acquirer system of an acquirer.

Further embodiments or aspects are set forth in the following numbered clauses:

Clause 1: A method for dynamic development of an application programming interface (API) comprising: receiving, with at least one processor, a first data file comprising a plurality of data entries, each data entry comprising a plurality of values of a plurality of specific data parameters; generating, with at least one processor, an API configured to receive client data associated with a transaction message, wherein the generating the API comprises: providing a data agnostic template including a first graphical user interface, the data agnostic template comprising a plurality of data agnostic parameters, each data agnostic parameter comprising a template field, each template field configured to receive a specific data entry associated with a specific data parameter of the plurality of specific data parameters; for each specific data parameter of the plurality of specific data parameters, assigning each template field with a corresponding specific data entry associated with the specific data parameter; and configuring a second user interface associated with the API by associating at least one display parameter with each specific data parameter of the plurality of specific data parameters; and displaying, with at least one processor, the second user interface, such that a field displayed by the second user interface is configured to receive the data associated with each specific data parameter of the plurality of specific data parameters.

Clause 2: The method of clause 1, wherein a specific data parameter of the plurality of specific data parameters comprises a specific label associated with the specific data parameter.

Clause 3: The method of clause 1 or 2, wherein the plurality of specific data parameters comprise at least one data element associated with data elements defined by ISO 8583.

Clause 4: The method of any of clauses 1-3, wherein the plurality of specific data parameters comprise at least one data element associated with a client identifier.

Clause 5: The method of any of clauses 1-4, wherein the first data file is associated with a first acquirer system, the method further comprising: receiving, with at least one processor, the data associated with each specific data parameter of the plurality of specific data parameters; based on the received data, generating, with at least one processor, a second data file; generating, with at least one processor and based on the second data file, an API associated with the first acquirer system; receiving, with at least one processor, an abbreviated transaction message from the first acquirer system, the abbreviated transaction message associated with a payment transaction; and augmenting, with at least one processor and based on the API, the abbreviated transaction message with at least a portion of the data from the second data file.

Clause 6: The method of any of clauses 1-5, further comprising: receiving, with at least one processor, another data file comprising a plurality of data entries, each data entry comprising a plurality of second specific data parameters, the second specific data parameters different from the specific data parameters associated with the first data file; and using the data agnostic template to display a user interface configured to receive client data associated with each second specific data parameter of the plurality of second specific data parameters.

Clause 7: The method of any of clauses 1-6, wherein the first data file is received by a transaction processing system of a transaction service provider from an issuer system of an issuer bank or an acquirer system of an acquirer.

Clause 8: A system for dynamic development of an application programming interface (API) comprising at least one processor programmed or configured to: receive a first data file comprising a plurality of data entries, each data entry comprising a plurality of values of a plurality of specific data parameters; generate an API configured to receive client data associated with a transaction message by: providing a data agnostic template including a first graphical user interface, the data agnostic template comprising a plurality of data agnostic parameters, each data agnostic parameter comprising a template field, each template field configured to receive a specific data entry associated with a specific data parameter of the plurality of specific data parameters; for each specific data parameter of the plurality of specific data parameters, assigning each template field with a corresponding specific data entry associated with the specific data parameter; and configuring a second user interface associated with the API by associating at least one display parameter with each specific data parameter of the plurality of specific data parameters; and display the second user interface, such that a field displayed by the second user interface is configured to receive the data associated with each specific data parameter of the plurality of specific data parameters.

Clause 9: The system of clause 8, wherein a specific data parameter of the plurality of specific data parameters comprises a specific label associated with the specific data parameter.

Clause 10: The system of clause 8 or 9, wherein the plurality of specific data parameters comprise at least one data element associated with data elements defined by ISO 8583.

Clause 11: The system of any of clauses 8-10, wherein the plurality of specific data parameters comprise at least one data element associated with a client identifier.

Clause 12: The system of any of clauses 8-11, wherein the first data file is associated with a first acquirer system and the at least one processor is programmed or configured to: receive the data associated with each specific data parameter of the plurality of specific data parameters; based on the received data, generate a second data file; generate, based on the second data file, an API associated with the first acquirer system; receive an abbreviated transaction message from the first acquirer system, the abbreviated transaction message associated with a payment transaction; and augment, based on the API, the abbreviated transaction message with at least a portion of the data from the second data file.

Clause 13: The system of any of clauses 8-12, wherein the at least one processor is programmed or configured to: receive another data file comprising a plurality of data entries, each data entry comprising a plurality of second specific data parameters, the second specific data parameters different from the specific data parameters associated with the first data file; and use the data agnostic template to display a user interface configured to receive client data associated with each second specific data parameter of the plurality of second specific data parameters.

Clause 14: The system of any of clauses 8-13, wherein the first data file is received by a transaction processing system of a transaction service provider from an issuer system of an issuer bank or an acquirer system of an acquirer.

Clause 15: A computer program product for dynamic development of an application programming interface (API), the computer program product comprising at least one non-transitory computer-readable medium including one or more instructions that, when executed by at least one processor, cause the at least one processor to: receive a first data file comprising a plurality of data entries, each data entry comprising a plurality of values of a plurality of specific data parameters; generate an API configured to receive client data associated with a transaction message by: providing a data agnostic template including a first graphical user interface, the data agnostic template comprising a plurality of data agnostic parameters, each data agnostic parameter comprising a template field, each template field configured to receive a specific data entry associated with a specific data parameter of the plurality of specific data parameters; for each specific data parameter of the plurality of specific data parameters, assigning each template field with a corresponding specific data entry associated with the specific data parameter; and configuring a second user interface associated with the API by associating at least one display parameter with each specific data parameter of the plurality of specific data parameters; and display the second user interface, such that a field displayed by the second user interface is configured to receive the data associated with each specific data parameter of the plurality of specific data parameters.

Clause 16: The computer program product of clause 15, wherein a specific data parameter of the plurality of specific data parameters comprises a specific label associated with the specific data parameter.

Clause 17: The computer program product of clause 15 or 16, wherein the plurality of specific data parameters comprise at least one data element associated with data elements defined by ISO 8583.

Clause 18: The computer program product of any of clauses 15-17, wherein the plurality of specific data parameters comprise at least one data element associated with a client identifier.

Clause 19: The computer program product of any of clauses 15-18, wherein the first data file is associated with a first acquirer system and the one or more instructions cause the at least one processor to: receive the data associated with each specific data parameter of the plurality of specific data parameters; based on the received data, generate a second data file; generate, based on the second data file, an API associated with the first acquirer system; receive an abbreviated transaction message from the first acquirer system, the abbreviated transaction message associated with a payment transaction; and augment, based on the API, the abbreviated transaction message with at least a portion of the data from the second data file.

Clause 20: The computer program product of any of clauses 15-19, wherein the one or more instructions cause the at least one processor to: receive another data file comprising a plurality of data entries, each data entry comprising a plurality of second specific data parameters, the second specific data parameters different from the specific data parameters associated with the first data file; and use the data agnostic template to display a user interface configured to receive client data associated with each second specific data parameter of the plurality of second specific data parameters.

Clause 21: The computer program product of any of clauses 15-20, wherein the first data file is received by a transaction processing system of a transaction service provider from an issuer system of an issuer bank or an acquirer system of an acquirer.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the non-limiting exemplary embodiments that are illustrated in the accompanying schematic figures, in which:

FIG. 3A shows a schematic of a first file according to a non-limiting embodiment or aspect;

FIG. 3B shows a schematic of a second file according to a non-limiting embodiment or aspect;

FIG. 4A shows a schematic of a first graphical user interface displaying a data agnostic template according to a non-limiting embodiment or aspect;

FIG. 4B shows a schematic of the first graphical user interface from FIG. 4A having several of the template fields of the data agnostic template assigned with a corresponding specific data entry associated with a specific data parameter according to a non-limiting embodiment or aspect;

FIG. 5 shows a schematic of a display configuration screen according to a non-limiting embodiment or aspect;

FIG. 7A shows a schematic of another first file according to a non-limiting embodiment or aspect;

DETAILED DESCRIPTION

Figure 1:
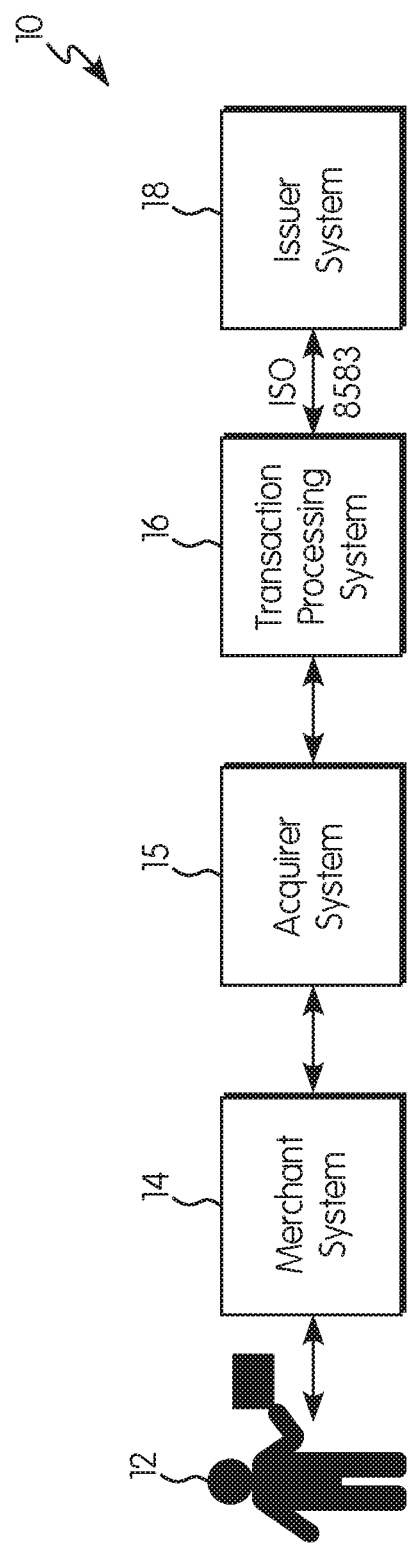
FIG. 1 shows a schematic view of one non-limiting embodiment or aspect of an existing electronic payment processing network.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing system may include one or more processors and, in some non-limiting embodiments, may be operated by or on behalf of a transaction service provider.

As used herein, the term "issuer institution" or "issuer" may refer to one or more entities, such as a bank, that provide accounts to customers for conducting transactions (e.g., payment transactions), such as initiating credit and/or debit payments. For example, an issuer institution may provide an account identifier, such as a personal account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer institution" or "acquirer" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computer systems, computer devices, software applications, and/or the like operated by or on behalf of an acquirer institution.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some non-limiting embodiments, an original account identifier, such as a PAN, may be associated with a plurality of tokens for different individuals or purposes.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a security card, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "server" may refer to or include one or more processors or computers, storage devices, or similar computer arrangements that are operated by or facilitate communication and processing for multiple parties in a network environment, such as the internet, although it will be appreciated that communication may be facilitated over one or more public or private network environments and that various other arrangements are possible. Further, multiple computers, e.g., servers, or other computerized devices, e.g., point-of-sale devices, directly or indirectly communicating in the network environment may constitute a "system," such as a merchant's point-of-sale system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "computing device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. In other non-limiting embodiments, the computing device may be a desktop computer or other non-mobile computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

Non-limiting embodiments or aspects of the present disclosure are directed to a method, system, and computer program products for dynamic development of an application programming interface (API). Non-limiting embodiments or aspects include a data agnostic template that reduces the time required to onboard a client. The data agnostic template may reduce the time required to onboard a client by reducing or eliminating the amount of hardcoding required by the developer to convert the first data file from the first format to the second data file having a second format. By utilizing a metadata-driven flexible framework the onboarding parameters can be easily and quickly added, removed, or modified to convert the first data file having the first format to the second data file having the second format. In this way, the flexibility of the metadata driven flexible framework of the data agnostic template allows the system to handle data submitted by the client to the system in any format, as well as any type of data submitted by the client to the system. Further, processing resources required to complete the onboarding process (e.g., convert the first file to the reconfigured second file) are advantageously reduced. In addition, the metadata-driven flexible framework of the present disclosure also allows for quicker, more efficient modification of existing, previously-developed APIs for onboarding.

Referring to FIG. 1, an existing electronic payment processing network 10 is shown in which a payment transaction between a consumer 12 and a merchant is processed. To initiate the payment transaction, the consumer 12 presents a payment device (e.g., credit card) to a merchant system 14 (e.g., merchant POS device) operated by or on behalf of the merchant. The merchant system 14 communicates a transaction message to an acquirer system 15 (e.g., a merchant bank) of the merchant. The acquirer system 15 communicates the transaction message to the transaction processing system (TPS) 16 operated by or on behalf of the transaction service provider associated with the consumer's 12 payment device to request that the payment transaction be processed. The TPS 16 communicates an authorization request to an issuer system 18 operated by or on behalf of the issuer who issued the payment device to the consumer 12. The authorization request conforms to ISO 8583 in its format. In response to the authorization request, the issuer system 18 makes an authorization decision as to whether the payment transaction is to be approved or declined. The issuer system 18 communicates an authorization response containing the authorization decision to the TPS 16, and the authorization response conforms to ISO 8583 in its format. The TPS 16 then communicates the authorization response to the acquirer system 15 which, in turn, communicates the authorization response to the merchant system 14, which is subsequently conveyed to the consumer 12.

In order for the acquirer system 15 and/or the issuer system 18 to participate in the electronic payment processing network 10 facilitated by the TPS 16, the TPS 16 may store certain data associated with the acquirer system 15 and/or issuer system 18. The TPS 16 may store this data in a predetermined format, such that the authorization message can be communicated according to the ISO 8583 format. The predetermined format may be different from the format in which the data is stored on the acquirer system 15 and/or the issuer system 18. To participate in the electronic payment processing network 10 facilitated by the TPS 16, the issuer system 18 and/or acquirer system 15 may be onboarded with the TPS 16. The onboarding process may be performed as described herein. In some non-limiting embodiments, the information received from the acquirer system 15 and/or the issuer system 18 as part of the onboarding process may include static data that is the same for each payment transaction in which that acquirer system 15 and/or the issuer system 18 is involved with processing.

Figure 2A:
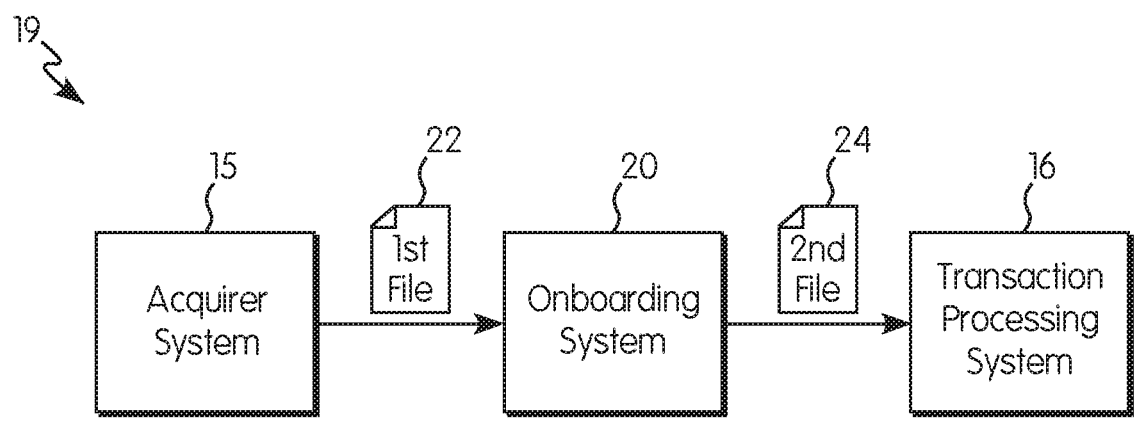
FIG. 2A shows a schematic view of a system for onboarding by dynamically developing an application programming interface (API) according to a non-limiting embodiment or aspect.

Referring to FIG. 2A, a system 19 for onboarding the acquirer system 15 with the TPS 16 is shown. The system 19 includes the TPS 16 and the acquirer system 15. Additionally or alternatively, the system 19 may further include an onboarding system 20 operated by or on behalf of the transaction service provider or other third party entity. In some non-limiting embodiments, the onboarding system 20 may be a component of the TPS 16.

With continued reference to FIG. 2A, the acquirer system 15 may include a first data file 22 that includes data, and the acquirer system 15 may communicate the first data file 22 to the onboarding system 20. In some non-limiting examples, the acquirer system 15 communicates the first data file 22 without performing any reformatting or reconfiguration of the first data file, such that the first data file 22 is communicated exactly as it exists on the acquirer system 15.

With continued reference to FIG. 2A, the onboarding system 20 may generate a second data file 24 in response to receiving the first data file 22. The second data file 24 may include at least a portion of the data from the first data file 22, although that data may be rearranged, reformatted, relabeled, or otherwise edited. In some non-limiting embodiments, generating the second data file 24 may include generating a new file and storing at least a portion of the data from the first data file 22 to the newly generated second data file 24. In other non-limiting embodiments, generating the second data file 24 may include editing the existing first data file 22, such that the first data file 22 is reconfigured to constitute the second data file 24.

In some non-limiting embodiments, the second data file 24 may include at least a portion of the data from the first data file 22. In some non-limiting embodiments, certain data from the first data file 22 may be directly included in the second data file 24 without any alterations. In some non-limiting embodiments, certain data from the first data file 22 may be relabeled and included in the second data file 24 (e.g., the data given a different heading in a table). In some non-limiting embodiments, certain data from the first data file 22 may be merged together and included in the second data file 24 (e.g., separate first name and last name columns in a first data file 22 may be merged into a single "Name" column in the second data file 24). In some non-limiting embodiments, certain data from the first data file 22 may be split apart and included in the second data file 24 (e.g., a single "Name" column in a first data file 22 may be split into separate first name and last name columns in the second data file 24). In some non-limiting embodiments, certain data from the first data file 22 may be reformatted and included in the second data file 24 (e.g., a date in the format 01.01.2018 in the first data file 22 may be reformatted to 01/01/2018 in the second data file 24). Certain data from the first data file 22 may be omitted altogether from the second data file 24. The data from the first data file 22 may be rearranged, reformatted, relabeled, or otherwise edited and included in the second data file in any other suitable way. Certain data not included in the first data file 22 may be included in the second data file 24 (e.g., an identifier may be added to associate the data in the second data file 24 with the system communicating the first data file 22 to the onboarding system 20).

Figure 2B:
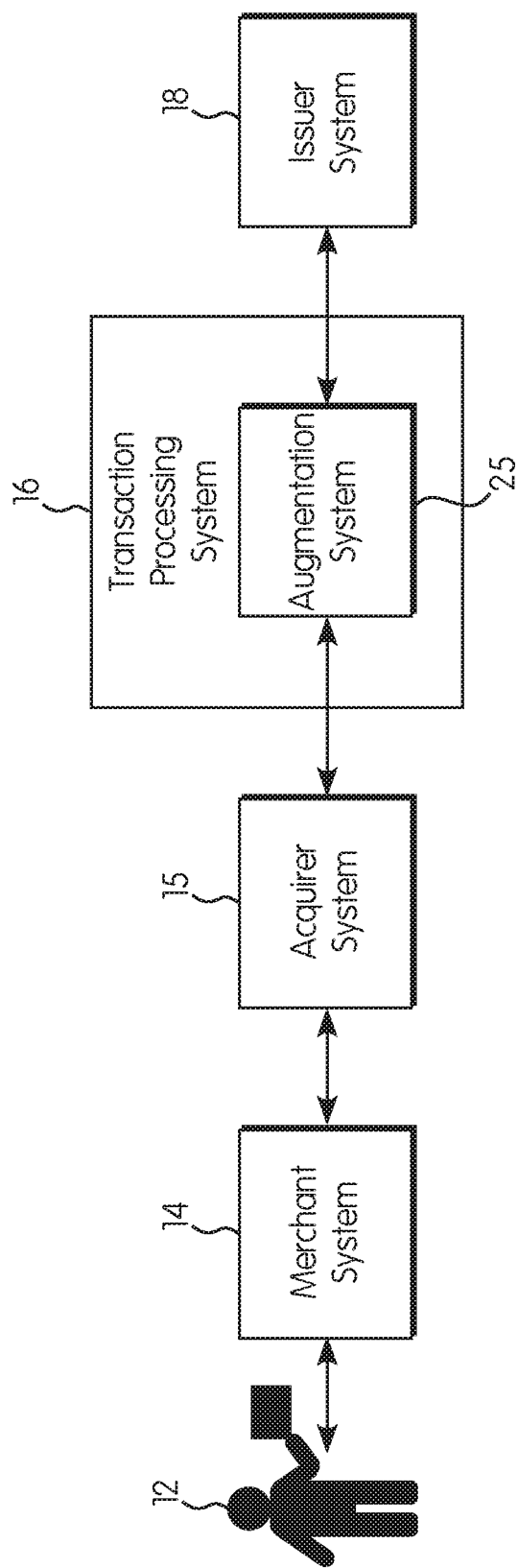
FIG. 2B shows a schematic view of an augmentation system for processing transaction using the API according to a non-limiting embodiment or aspect.

In response to generating the second data file 24, the onboarding system 20 may communicate the second data file 24 to the TPS 16. The TPS 16 may store the second data file 24 and utilize the second data file 224 for downstream processing, such as processing payment transactions with the acquirer system 15 in the electronic payment processing network 10 shown in FIG. 2B. In this way, communicate of the second data file 24 to the TPS 16 to generate the API, which is executed by a processor or other hardware, for instance, an augmenting system 25 as shown in FIG. 2B.

Referring to FIG. 3A, a non-limiting embodiment of the first data file 222 is shown. The first data file 122 may include a plurality of data entries 126, and each data entry 126 may include a plurality of values of specific data parameters 130. In other words, the first row of the first data file 122 table includes the specific data parameters 130, which are column headings of the table, and subsequent rows include data entries 126 in the table for the specific data parameters 130. Each data entry 126 includes client data 128 associated with each specific data parameter 130. As one non-limiting example from the first data file 122 shown in FIG. 3A, "Merchant ID" is a specific data parameter 130, and in the first data entry, the client data 128 associated with "Merchant" is "0001".

Referring to FIG. 3B, a non-limiting embodiment of the second data file 124 converted from the first data file 122 is shown. The second data file 124 includes at least a portion of the data from the first data file 122. For example, the data associated with "Acquirer BIN" from the first data file 122 is included in the second data file 124. Moreover, the data associated with "Acquirer Country Code" from the first data file 122 is included in the second data file 124. New data labeled "Client ID" in the second data file 124 was not previously included in the first data file 122 and constitutes an identifier associated with the acquirer system 15 (a client identifier) communicating the first data file 122 or a merchant associated with the acquirer system 15. In this way, the second data file 124 includes at least a portion of the data from the first data file 122, although that data may be rearranged, reformatted, relabeled, or otherwise edited.

In response to receiving the first data file 122, the onboarding system 20 may generate the second data file 224, which may be communicated to downstream system (e.g., the augmentation system 25 of FIG. 2B) to cause an API to be generated. The second data file 224 used to create the API may be generated as described below in association with FIGS. 4A-6.

Referring to FIGS. 4A and 4B, a data agnostic template 32 displayed on a first graphical user interface (GUI) 34 is shown according to a non-limiting embodiment or aspect. It will be appreciated that different layouts of the data agnostic template 32 and first GUI 34 are also contemplated under this disclosure. The data agnostic template 32 may include a plurality of data agnostic parameters 36. The data agnostic parameters 36 may each include a template field 38. In FIG. 4A, the template fields 38 are empty and are configured to receive a specific data entry associated with a specific data parameter 130. In FIG. 4B, for each specific data parameter 130, each template field 38 is assigned a corresponding specific data entry 40 associated with the specific data parameter 130. In this non-limiting example, at least one of the specific data parameters may include a data element associated with data elements defined by ISO 8583 (e.g., data fields 1-128 of the ISO-defined data elements).

Referring to FIGS. 3A, 3B, and 4B, in the example shown in FIG. 4B, the specific data parameter 130 entered from the first data file 122 is "Acquirer BIN". In FIG. 4B, "Acquirer BIN" is entered into the template field 38 associated with the data agnostic parameter 36 entitled "Extract Field Name", which corresponds to the title of the specific data parameter 130 from the first data file 122. Under the data agnostic parameter 36 entitled "Field Name", the labeled specific data parameter 130 of "Acquirer BIN" is included as the template field 38 as the corresponding specific data entry 40 associated with the specific data parameter 130. Other data agnostic parameters may be included in the data agnostic template 32, such as "Field Label" (label for the particular "Field Name" on the later described GUI), "Field Type" (e.g., whether the field contains numbers, characters, some combination thereof, or the like), "Max Field Length" (e.g., count of the maximum number of numbers and/or characters associated with the client data), and the like. It will be appreciated that additional data agnostic parameters 36 may be included.

With continued reference to FIGS. 4A and 4B, any number of specific data parameters 130 may be entered into the data agnostic template 32. In one non-limiting example, the specific data parameters 130 are entered one at a time into the data agnostic template 32 until each relevant specific data parameter has been entered into the data agnostic template 32 such that the second file used to generate the API can be generated.

Referring to FIG. 5, a display configuration screen 42 is shown. The display configuration screen 42 may appear after each specific data parameters 130 has been entered into the data agnostic template. For example, in FIG. 5, four separate specific data parameters 130 were entered into the data agnostic template 32 (i.e., "Client ID", "Acquirer BIN", "Acquirer Country Code", and "Acquirer Business ID")

Figure 6:
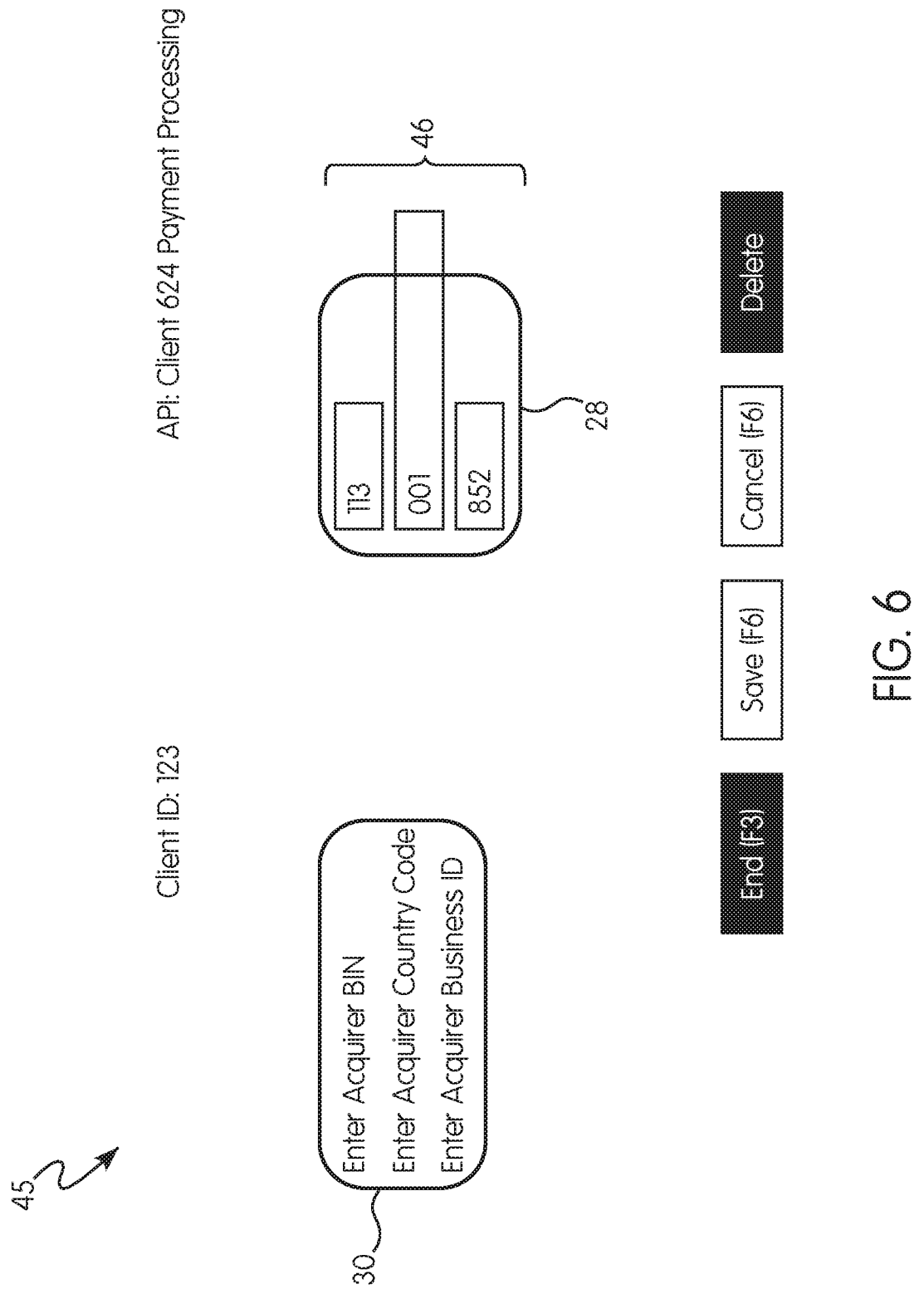
FIG. 6 shows a schematic of a second user interface according to a non-limiting embodiment or aspect.

With continued reference to FIG. 5, the display configuration screen 42 may be used to configure a second GUI (e.g., the second GUI 45 in FIG. 6). The configuration may be effected by associating at least one display parameter 44 with each specific data parameter 130. The display parameters 44 may determine how the specific data parameters 130 are arranged on the second GUI 45. Non-limiting examples of display parameters include a parameter for whether an entry must be associated with the specific data parameters 130, whether a warning is to be generated for an entry associate with the specific data parameter 130 that is blank, whether the specific data parameter 130 is associated with an updateable field, the order and configuration of the specific data parameters 130 on the second GUI 45, and the like.

Referring to FIG. 6, the second GUI 45 is shown according to one non-limiting embodiment or aspect. On the second GUI 45, the specific data parameters 130 are arranged as configured from the display configuration screen 42. The second GUI may include client data fields 46 that are configured to receive the client data 128 associated with each specific data parameter 130. The second GUI 45 may receive the client data associated with each specific data parameter 130 for each data entry 126, such that all of the relevant client data 128 from the first data file 122 is onboarded by the onboarding system 20 by generating the second data file 124. The second GUI may automatically receive the client data 128 from the first data file 122, such that once the second file is generated, it may be communicated to the a system that will generate an API dynamically based on that second data file 122.

Referring back to FIGS. 3A-6, as previously described, an API may be dynamically generated based on the second data file 124 generated by the onboarding system 20 based on the data contained in the first data file 122. The generated API may be specific to that particular acquirer system 15. An API may be generated for other acquirer systems in this same manner so as to not require an onboarding API be hardcoded from scratch, saving processing resources and reducing onboarding time.

Referring back to FIG. 2B a non-limiting embodiment or aspect of a method for processing transactions using an augmentation system 25 that executes the dynamically generated API is shown. In response to the onboarding system 20 generating the second data file 24, the second data file 24 may be communicated to the TPS 16, which may generate the API. In this non-limiting example, the generated API may be specific to the acquirer system 15 onboarded in FIG. 2A, such that the TPS 16 is configured to process payment transactions of the acquirer system 15.

In one non-limiting example, and with continued reference to FIG. 2B, the consumer 12 may initiate a transaction with the merchant system 14 (e.g., merchant POS device). The merchant system 14 may communicate a transaction message to the acquirer system 15 (the merchant bank of that merchant). The acquirer system 15 may communicate the transaction message to the transaction processing system (TPS) 16 associated with the consumer's 12 payment device to request that the payment transaction be processed. In this particular non-limiting embodiment, the acquirer system 15 may communicate the transaction message to the augmentation system 25 of the TPS 16, and the augmentation system 25 may include one or more computer systems, computer devices, software applications, and/or the like operated by or on behalf of, for example, the transaction service provider.

The transaction message communicated to the augmentation system 25 may be different from the transaction message described in connection with FIG. 1. The transaction message in this case may be an abbreviated transaction message compared to the transaction message described in connection with FIG. 1. The abbreviated transaction message may include less data compared to the transaction message described in FIG. 1 from the acquirer system 15 to the TPS 16. The abbreviated transaction message may contain data identifying the acquirer system 15. The abbreviated transaction message may also include dynamic transaction data that is different from transaction to transaction for that acquirer system 15. For example, data associated with transaction amount, consumer information, and the like may be different for each transaction in which the acquirer system 15 is involved. However, the abbreviated transaction message may not include at least a portion of static transaction data that is the same from transaction to transaction for the acquirer system 15. For example, data such as Acquirer BIN, Acquirer Country Code, and Acquirer Business ID may be the same for each transaction in which that acquirer is involved. Therefore, the abbreviated transaction message reduces the amount of data required for transmission by the acquirer system 15 and enhances the efficiency with which the transaction is processed. This also enhances the accuracy of transactions being processed by avoiding incorrect static transaction data being transmitted in the transaction messages.

In response to receiving the abbreviated transaction message, the augmentation system 25 may determine the acquirer system involved in the payment transaction and augment the abbreviated transaction message by including at least a portion of the static transaction data therein. This augmented message may be used by the TPS 16 to generate the authorization request communicated by the TPS 16 to the issuer system 18. This authorization request generated from the abbreviated transaction message, the static transaction data augmented by the augmentation system 25, and other required data from the TPS 16 may conform to ISO 8583.

In response to the authorization request, the issuer system 18 may make an authorization decision as to whether the payment transaction is to be approved or declined. The issuer system 18 may communicate an authorization response containing the authorization decision to the TPS 16, and the authorization response may conform to ISO 8583 in its format. The TPS 16 may then communicate the authorization response to the acquirer system 15 which, in turn, communicates the authorization response to the merchant system 14, which is subsequently conveyed to the consumer 12.

Referring to FIG. 7A, another non-limiting embodiment of the first data file 222 is shown that is associated with onboarding an issuer system 18 so that the issuer system 18 may conduct payment transactions with the TPS 16. The first data file 222 may include a plurality of data entries 26, and each data entry may include a plurality of values of specific data parameters 30. In other words, the first row of the first data file 222 table includes the specific data parameters 30, which are column headings of the table, and subsequent rows are data entries 26 in the table. Each data entry 26 includes client data 28 associated with each specific data parameter 30. As one non-limiting example from the first data file 222 shown in FIG. 7A, "Consumer ID" is a specific data parameter 30, and in the first data entry, the client data 28 associated with "Consumer ID" is "0001".

Figure 7B:
FIG. 7B shows a schematic of another second file according to a non-limiting embodiment or aspect.

Referring to FIG. 7B, a non-limiting embodiment of the second data file 224 converted from the first data file 222 is shown. The second data file 224 includes at least a portion of the data from the first data file 222. For example, the data associated with "Consumer ID" from the first data file 222 is included in the second data file 224; however, this data has been relabeled "Client's Consumer ID". Moreover, the data associated with "PAN" from the first data file 222 is included in the second data file 224 and relabeled as "ISO 8583 Data Field 2". New data labeled "Client ID" in the second data file 224 was not previously included in the first data file 222 and constitutes an identifier associated with the issuer system 18 (a client identifier) communicating the first data file 222 (e.g., the transaction service provider identifies that specific issuer system as "624"). In this way, the second data file 224 includes at least a portion of the data from the first data file 222, although that data may be rearranged, reformatted, relabeled, or otherwise edited.

With continued reference to FIGS. 3A, 3B, 7A, and 7B, previously described examples contemplated onboarding an acquirer system 15 with the TPS and an issuer system 18 with a TPS 16. In the non-limiting embodiment of the first data file 122 in FIGS. 3A and 3B, for example, the data is associated with a merchant system 14 and/or an acquirer system (not shown) to be onboarded with the TPS 16. In the non-limiting embodiment of the first data file 222 in FIGS. 7A and 7B, for example, the data is associated with an issuer system 18 to be onboarded with the TPS 16. However, it will be appreciated that the system 19 may be utilized in any suitable onboarding application in which a second data file has a format different from the first data file of the client.

Figure 8:
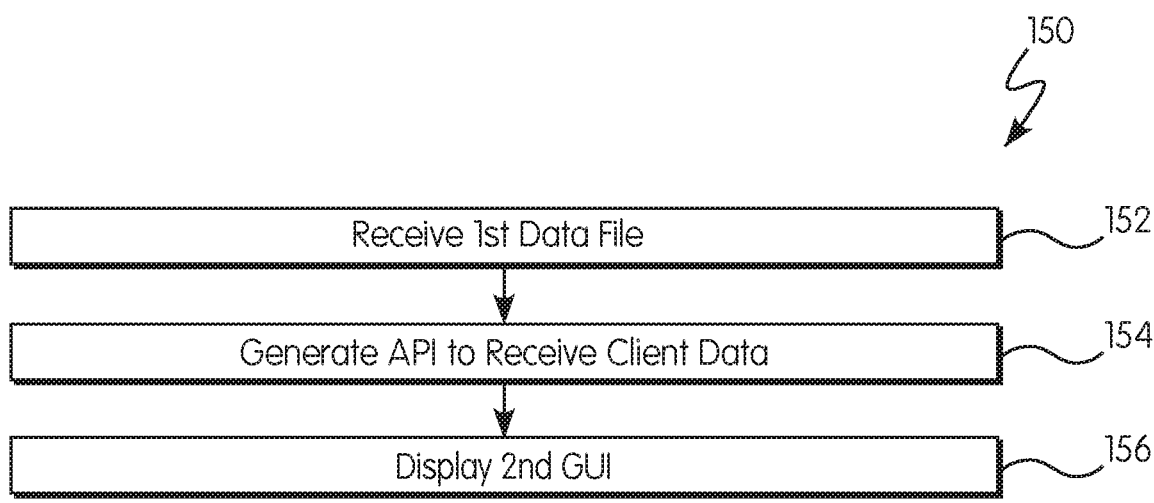
FIG. 8 shows a step diagram of a method for dynamic development of an API according to a non-limiting embodiment or aspect.

Referring to FIG. 8, one non-limiting embodiment or aspect of a method 150 for dynamic development of an API is shown. At a first step 152, the onboarding system may receive the first data file including a plurality of data entries, each data entry comprising the plurality of values of specific data parameters. At a second step 154, the onboarding system may generate an API configured to receive the data associated with a transaction message. At a third step 156, the onboarding system may display the second GUI, such that a field displayed by the second GUI is configured to receive the data associated with each specific data parameter of the plurality of specific data parameters.

Figure 9:
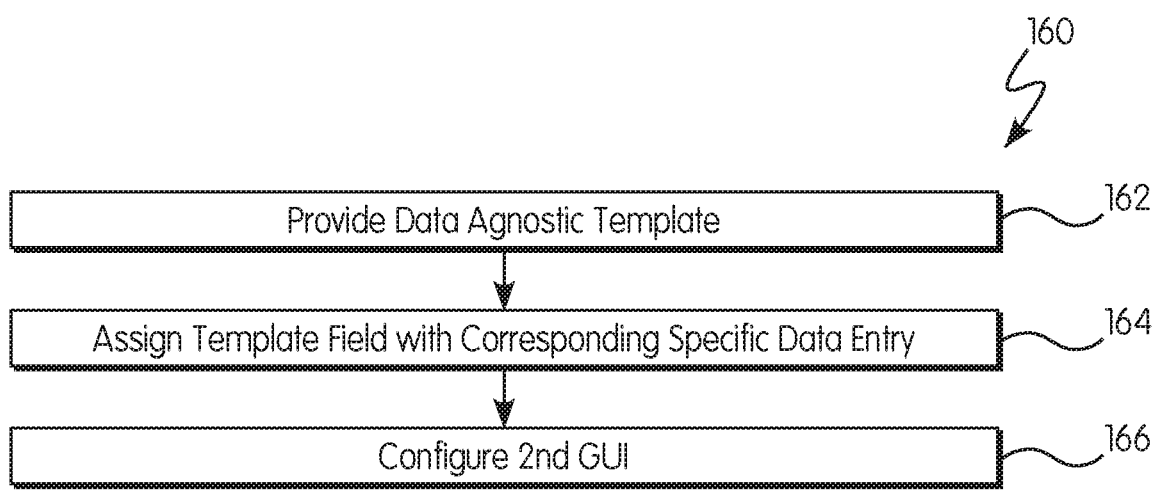
FIG. 9 shows a step diagram of a non-limiting embodiment or aspect of a method for generating an API according to a non-limiting embodiment or aspect.

Referring to FIG. 9, one non-limiting embodiment or aspect of a method 160 for generating the API is shown. At a first step 162, a data agnostic template is provided including the first graphical user interface, the data agnostic template including the plurality of data agnostic parameters, each data agnostic parameter comprising a template field, each template field configured to receive a specific data entry associated with a specific data parameter of the plurality of specific data parameters. At a second step 164, for each specific data parameter of the plurality of specific data parameters, each template field is assigned with a corresponding specific data entry associated with the specific data parameter. At a third step 166, the second GUI is configured by associating the at least one display parameter with each specific data parameter of the plurality of specific data parameters.

In a further, non-limiting embodiment or aspect, a computer program product for dynamic development of an API includes at least one non-transitory computer readable medium including program instructions that, when executed by at least one processor, cause the at least one processor to execute one of the previously-described systems and/or methods. The at least one processor may include the onboarding system 20.

The computer program product may include a plurality of computer-readable media, such as a first computer-readable medium and a second computer-readable medium. The first computer-readable medium may be located at the entity controlling the onboarding system 20. The second computer-readable medium may be located local to or remote from the entity controlling the onboarding system 20. The remote second computer-readable medium may be located at the system communicating the first data file to the onboarding system 20 (e.g., issuer system, merchant system, acquirer system, and the like).

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for dynamic development of an application programming interface (API) comprising:
    receiving, with at least one processor, a first data file comprising a plurality of data entries, each data entry comprising a plurality of values of a plurality of specific data parameters;
    generating, with at least one processor, an API configured to receive client data associated with a transaction message, wherein the generating the API comprises:
        providing a data agnostic template including a first graphical user interface, the data agnostic template comprising a plurality of data agnostic parameters, each data agnostic parameter comprising a template field, each template field configured to receive a specific data entry associated with a specific data parameter of the plurality of specific data parameters;
        for each specific data parameter of the plurality of specific data parameters, assigning each template field with a corresponding specific data entry associated with the specific data parameter; and
        configuring a second user interface associated with the API by associating at least one display parameter with each specific data parameter of the plurality of specific data parameters; and
    displaying, with at least one processor, the second user interface, such that a field displayed by the second user interface is configured to receive the data associated with each specific data parameter of the plurality of specific data parameters.

2. The method of claim 1, wherein a specific data parameter of the plurality of specific data parameters comprises a specific label associated with the specific data parameter.

3. The method of claim 1, wherein the plurality of specific data parameters comprise at least one data element associated with data elements defined by ISO 8583.

4. The method of claim 1, wherein the plurality of specific data parameters comprise at least one data element associated with a client identifier.

5. The method of claim 1, wherein the first data file is associated with a first acquirer system, the method further comprising:
    receiving, with at least one processor, the data associated with each specific data parameter of the plurality of specific data parameters;
    based on the received data, generating, with at least one processor, a second data file;
    generating, with at least one processor and based on the second data file, an API associated with the first acquirer system;
    receiving, with at least one processor, an abbreviated transaction message from the first acquirer system, the abbreviated transaction message associated with a payment transaction; and
    augmenting, with at least one processor and based on the API, the abbreviated transaction message with at least a portion of the data from the second data file.

6. The method of claim 1, further comprising:
    receiving, with at least one processor, another data file comprising a plurality of data entries, each data entry comprising a plurality of second specific data parameters, the second specific data parameters different from the specific data parameters associated with the first data file; and
    using the data agnostic template to display a user interface configured to receive client data associated with each second specific data parameter of the plurality of second specific data parameters.

7. The method of claim 1, wherein the first data file is received by a transaction processing system of a transaction service provider from an issuer system of an issuer bank or an acquirer system of an acquirer.

8. A system for dynamic development of an application programming interface (API) comprising at least one processor programmed or configured to:
    receive a first data file comprising a plurality of data entries, each data entry comprising a plurality of values of a plurality of specific data parameters;
    generate an API configured to receive client data associated with a transaction message by:
        providing a data agnostic template including a first graphical user interface, the data agnostic template comprising a plurality of data agnostic parameters, each data agnostic parameter comprising a template field, each template field configured to receive a specific data entry associated with a specific data parameter of the plurality of specific data parameters;
        for each specific data parameter of the plurality of specific data parameters, assigning each template field with a corresponding specific data entry associated with the specific data parameter; and configuring a second user interface associated with the API by associating at least one display parameter with each specific data parameter of the plurality of specific data parameters; and display the second user interface, such that a field displayed by the second user interface is configured to receive the data associated with each specific data parameter of the plurality of specific data parameters.

9. The system of claim 8, wherein a specific data parameter of the plurality of specific data parameters comprises a specific label associated with the specific data parameter.

10. The system of claim 8, wherein the plurality of specific data parameters comprise at least one data element associated with data elements defined by ISO 8583.

11. The system of claim 8, wherein the plurality of specific data parameters comprise at least one data element associated with a client identifier.

12. The system of claim 8, wherein the first data file is associated with a first acquirer system and the at least one processor is programmed or configured to:

receive the data associated with each specific data parameter of the plurality of specific data parameters;

based on the received data, generate a second data file;

generate, based on the second data file, an API associated with the first acquirer system;

receive an abbreviated transaction message from the first acquirer system, the abbreviated transaction message associated with a payment transaction; and augment, based on the API, the abbreviated transaction message with at least a portion of the data from the second data file.

13. The system of claim 8, wherein the at least one processor is programmed or configured to:

receive another data file comprising a plurality of data entries, each data entry comprising a plurality of second specific data parameters, the second specific data parameters different from the specific data parameters associated with the first data file; and use the data agnostic template to display a user interface configured to receive client data associated with each second specific data parameter of the plurality of second specific data parameters.

14. The system of claim 8, wherein the first data file is received by a transaction processing system of a transaction service provider from an issuer system of an issuer bank or an acquirer system of an acquirer.

15. A computer program product for dynamic development of an application programming interface (API), the computer program product comprising at least one non-transitory computer-readable medium including one or more instructions that, when executed by at least one processor, cause the at least one processor to:

receive a first data file comprising a plurality of data entries, each data entry comprising a plurality of values of a plurality of specific data parameters;

generate an API configured to receive client data associated with a transaction message by:

providing a data agnostic template including a first graphical user interface, the data agnostic template comprising a plurality of data agnostic parameters, each data agnostic parameter comprising a template field, each template field configured to receive a specific data entry associated with a specific data parameter of the plurality of specific data parameters;

for each specific data parameter of the plurality of specific data parameters, assigning each template field with a corresponding specific data entry associated with the specific data parameter; and configuring a second user interface associated with the API by associating at least one display parameter with each specific data parameter of the plurality of specific data parameters; and display the second user interface, such that a field displayed by the second user interface is configured to receive the data associated with each specific data parameter of the plurality of specific data parameters.

16. The computer program product of claim 15, wherein a specific data parameter of the plurality of specific data parameters comprises a specific label associated with the specific data parameter.

17. The computer program product of claim 15, wherein the plurality of specific data parameters comprise at least one data element associated with data elements defined by ISO 8583.

18. The computer program product of claim 15, wherein the plurality of specific data parameters comprise at least one data element associated with a client identifier.

19. The computer program product of claim 15, wherein the first data file is associated with a first acquirer system and the one or more instructions cause the at least one processor to:

receive the data associated with each specific data parameter of the plurality of specific data parameters;

based on the received data, generate a second data file;

generate, based on the second data file, an API associated with the first acquirer system;

receive an abbreviated transaction message from the first acquirer system, the abbreviated transaction message associated with a payment transaction; and augment, based on the API, the abbreviated transaction message with at least a portion of the data from the second data file.

20. The computer program product of claim 15, wherein the one or more instructions cause the at least one processor to:

receive another data file comprising a plurality of data entries, each data entry comprising a plurality of second specific data parameters, the second specific data parameters different from the specific data parameters associated with the first data file; and use the data agnostic template to display a user interface configured to receive client data associated with each second specific data parameter of the plurality of second specific data parameters.

* * * * *